United States Patent Office 3,576,601
Patented Apr. 27, 1971

3,576,601
PROCESS FOR PRODUCTION OF PHOSPHORIC ACID BY THE USE OF AN ION EXCHANGE RESIN
Linden Wayne Cochran, Basking Ridge, N.J., assignor to Multi-Minerals Limited, Toronto, Ontario, Canada
No Drawing. Filed Aug. 17, 1967, Ser. No. 661,184
Claims priority, application Germany, May 27, 1967, M 74,138, M 74,139
Int. Cl. C01b 25/18
U.S. Cl. 23—165     3 Claims

ABSTRACT OF THE DISCLOSURE

This invention relates to a method for the production of an acid, such as phosphoric, sulfuric, arsenic, sulfurous, etc., by contacting a mother liquor comprising a saturated solution of a salt of the acid with the acid and a material containing a salt of the acid and the subsequent separation of suspended crystals from said mother liquor for conversion to the acid by contact with an ion exchange resin.

CROSS REFERENCE

The present invention is an improvement over applicant's copending patent application Ser. No. 386,764 filed July 31, 1964, and now Pat. No. 3,494,735 dated Feb. 10, 1970.

BACKGROUND OF THE INVENTION

A number of processes have been developed to produce acid. For example, the production of phosphoric acid in the past used tricalcium fluorophosphate, commonly known as apatite, as the starting material. Apatite has the formula $Ca_5(F \cdot Cl)(PO_4)_3$ and its commercial designation is phosphate rock which has the chemical formula $[Ca_3(PO_4)_2]_3 \cdot CaF_2$. Chemical and food grade phosphoric acid, $H_3PO_4$, has been produced by smelting apatite to form phosphorus, oxidizing the phosphorus to form phosphorus pentoxide, and dissolving the phosphorus pentoxide in water to produce phosphoric acid. These reactions may be expressed by the following equations:

(1) $[Ca_3(PO_4)_2]_3 \cdot CaF_2 + 10SiO_2 + 14C \rightarrow$
$$6P + 14CO + 10CaSiO_3 + CaF_2$$

(2) $2P + 5CO + 5O_2 \rightarrow P_2O_5 + 5CO_2$ (3) $P_2O_5 + 3H_2O \rightarrow 2H_3PO_4$ Phosphoric acid has been produced by several wet-process systems. In the most common wet-process system apatite is reacted with sulfuric acid to produce phosphoric acid and calcium sulfate according to the following reaction:

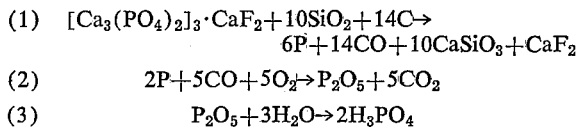

Another process utilizes hydrochloric acid to solubilize the apatite to form calcium chloride as the principal by-product according to the reaction:

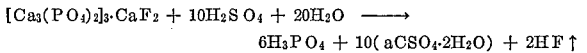

In a still further process hydrochloric acid is also used as the leachant and the phosphoric acid is separated from the other solubilized material by liquid-liquid extraction techniques utilizing an alkyl substituted phosphate as solvent.

Another system utilizes nitric acid as the solvent and the principal by-product is calcium nitrate which has value as a fertilizer ingredient. The chemistry is essentially as follows:

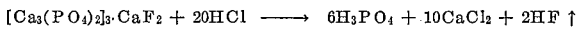

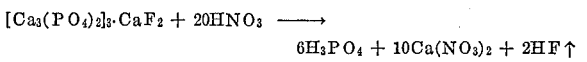

Another process involves treating a phosphate containing material with an excess of phosphoric acid to form a solution of monocalcium orthophosphate, separating undissolved material from the solution, cooling the solution to crystallize the monocalcium orthophosphate, and employing an ion-exchange resin to convert the monocalcium orthophosphate to phosphoric acid.

The solubility of monocalcium orthophosphate in phosphoric acid is directly related to temperature, but with respect to the concentration of dissolving acid, is more complicated. At low concentrations of acid, the salt is relatively insoluble. The solubility of the salt increases with the concentration of acid up to approximately 47% by weight concentration of $H_3PO_4$ where the solubility reaches a maximum. Thereafter, as the concentration of the acid increases the solubility of monocalcium orthophosphate declines rapidly, and for all practical purposes becomes insignificant at acid concentrations above 75% by weight.

This solubility characteristic of monocalcium orthophosphate in phosphoric acid places an upper limit on the quantity of material that can be produced in a unit volume of mother liquor as long as the limiting condition of solubilizing the salt in the mother liquor is adhered to.

OBJECTS OF THE INVENTION

Accordingly, a principal object of the present invention is to provide a process for the production of an acid, such as phosphoric acid, which is in highly purified form.

A further object is to provide a process for the production of an acid, such as phosphoric acid, from material containing salts of the acid wherein solubility of said salts is not a limiting factor.

Still another object of the invention is to provide a process for the production of an acid from material containing salts wherein separation of said salts is effected with minimal expenditure of thermal energy.

A still further object is to provide an improved process for the production of monocalcium orthophosphate.

Other and further objects of the invention will be obvious upon an understanding of the illustrative embodiment about to be described, or will be indicated in the appended claims, and various advantages not referred to herein will occur to one skilled in the art upon employment of the invention in practice.

SUMMARY OF THE INVENTION

Although for convenience the invention will be described in connection with phosphoric acid, it will be understood that it is applicable to the production of other acids, such as sulfuric, sulfurous, arsenic, etc.

In general, the inventive process comprises digesting a phosphate-containing material such as, for example, apatite, with phosphoric acid to produce a mother liquor saturated with monocalcium orthophosphate. The saturated mother liquor is then contacted with additional phosphoric acid and phosphate containing material and, preferably with substantially stoichiometric quantities of these materials, thereby forming monocalcium orthophosphate as a crystalline suspension. The suspended crystals are separated in whole or in part and contacted with an ion exchange resin preferably one which is strongly acidic, to effect conversion to phosphoric acid.

DETAILED DESCRIPTION

Accordingly, the present invention is based on the discovery that a mother liquor saturated with monocalcium orthophosphate can serve as a reaction medium in which virtually unlimited amounts of additional monocalcium orthophosphate can be produced by the reaction of additional quantities of phosphoric acid and apatite or other phosphate-bearing materials.

The present invention takes advantage of the limited solubility of monocalcium orthophosphate and contrasts sharply with prior art processes wherein production of phosphoric acid is dependent upon and limited by solubility of monocalcium orthophosphate.

In prior art processes the relative insolubility of the latter places an upper limit on the amount of material which can be produced and converted to phosphoric acid with a given liquid capacity of the digester-crystallizer facilities.

By utilizing this relative insolubility of the monocalcium orthophosphate in orthophosphoric acid to maintain the mother liquor in a saturated state at all times, virtually unlimited quantities of monocalcium orthophosphate can be produced, transported, and filtered from a unit volume of the mother liquor. The limiting factor is the level at which the mother liquor loses its fluid characteristics and becomes a de facto solid.

Quantities in excess of 750 parts of monocalcium orthophosphate per 1000 parts of mother liquor have been produced, transported and filtered without mechanical or chemical problems according to the present invention.

It is not necessary that an extensive temperature drop be utilized to force the removal of the dissolved monocalcium phosphate from the mother liquor, since the monocalcium orthophosphate is already available in the mother liquor as a suspension of insoluble crystalline materials. The preexistence of a saturated mother liquor precludes further dissolution of monocalcium orthophosphate at the particular temperature at which the mother liquor is held. A slight temperature gradient between digester and crystallizer will facilitate agglomeration of the existing crystals in suspension. Further growth of the crystals in suspension will be aided by the precipitation of additional monocalcium orthophosphate from solution.

The process of the invention is efficient in that minimum thermal energy is expended in forcing a desired amount of monocalcium orthophosphate from the mother liquor, such expenditure representing energy which must be restored. Accordingly, the process contrasts with solution processes wherein separation by crystallization is effected by cooling, a technique wasteful of thermal energy.

While the present process is applicable to any phosphate containing material, apatite (tricalcium fluorophosphate) is mentioned as a typical phosphate containing starting material. It is to be understood, however, that the process is not limited to apatite and those skilled in the art will understand that other phosphate containing materials are equally useful.

When the starting material is a phosphate rock which contains insoluble non-phosphate material in addition to the phosphate containing material, the mother liquor will contain undissolved material in addition to the suspended monocalcium orthophosphate. With relatively low levels of suspended salt, the undigested residues can be removed in part by gravity separation and decantation of the mother liquor.

In the alternative, if it is felt desirable, the filtered and washed monocalcium orthophosphate can be first dissolved in a suitable solvent, preferably phosphoric acid, the solution filtered to remove the undigested residues and the clarified solution then contacted with an ion exchange resin to remove calcium and other included cations, such as rare earths which may be present.

Ordinarily, the amount of foreign materials which will be found in beneficiated apatite and which will not be readily soluble in orthophosphoric acid will be a very small proportion of the total. These materials can be passed through the resin bed without fear of excessive damage to the resin, as experience in the uranium extraction industry has demonstrated. Up to 10% undissolved solids have been included in the feed to the ion exchange systems without deleterious effect. Only in relatively crude phosphate-containing starting material would a level of insolubles this high be likely to exist in the monocalcium orthophosphate produced therefrom. In this instance, the addition of a dissolving and filtration step subsequent to the filtration or centrifugation and washing stages and prior to the ion exchange stage would serve to remove the undigested materials. In the ordinary course of events, however, an entrained foreign material in the monocalcium orthophosphate would be effectively filtered from the product acid by the ion exchange bed itself and removed from the bed in the subsequent backwash stages prior to regeneration.

The following is illustrative of a detailed description of the inventive process:

Phosphoric acid is saturated with monocalcium orthophosphate by the simple addition of apatite or other phosphate-containing material until the further addition of phosphatic material results in the development of visible particles. The quantity of material required for such saturation is a function of the $P_2O_5$ content of the phosphate-containing material, the $P_2O_5$ content of the orthophosphoric acid used to react with the material and the temperature of the reaction medium. These conditions cannot be specified in advance for all possible combinations and permutations of materials and temperatures that might be encountered. The reaction should be performed with the reacting medium under continuous agitation to effect rapid contact of the phosphate-containing materials with the phosphoric acid and with continuous sparging, for example with air, $N_2$ or other gases inert to the reaction, to assist in the removal of fluorine or volatile fluorine compounds resulting from the decomposition of calcium fluoride or other fluorine complexes that may be found in the apatite or other phosphate-containing materials used for the production of the monocalcium orthophosphate.

To the saturated solution of monocalcium orthophosphate in phosphoric acid thus produced, called the mother liquor, substantially stoichiometric quantities of phosphate-containing materials and phosphoric acid are added continuously or intermittently to produce the desired output of monocalcium orthophosphate per unit of time, according to the following generalized reaction

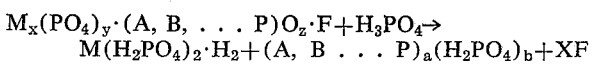

$$M_x(PO_4)_y \cdot (A, B, \ldots P)O_z \cdot F + H_3PO_4 \rightarrow M(H_2PO_4)_2 \cdot H_2 + (A, B \ldots P)_a(H_2PO_4)_b + XF$$

where the first element on the left of the reaction equation represents the complex phosphate containing material used and the compounds to the right of the equation represent the reaction products therefrom.

At a predetermined liquid flow rate, established by the desired concentration of suspended monocalcium orthophosphate per unit volume of cycled mother liquor, the mother liquor is passed through a weir where entrained undigested solids may be optionally removed in part, or to the "crystallizer" vessel where the crystals of monocalcium orthophosphate are allowed an additional period of time for further development or agglomeration.

At a flow rate equal to the rate of input, the natant mother liquor is withdrawn from the "crystallizer" and is discharged to a filter or centrifuge where the suspended monocalcium orthophosphate is separated from the mother liquor. The depleted mother liquor is returned to the digester to replace that being continuously removed. The monocalcium orthophosphate removed from the mother liquor is washed to remove all traces of entrained mother liquor which will contain contaminating cations such as iron, aluminum or rare earths that are normally present in phosphate ores, for example, apatite ores, and fluoride anions, using as a wash medium water that is saturated in monocalcium orthophosphate, phosphoric acid that has been saturated with monocalcium orthophosphate, or relatively concentrated phosphoric acid of such strength that it will solubilize only a small fraction of the filtered salt. When acid is used as the washing medium it may be used in quantities up to the stoichiometric amount to produce the monocalcium orthophosphate produced, the wash material then being recycled to the digester.

The filtered, or centrifuged, and washed monocalcium orthophosphate is then contacted directly with a strong acid form of cation ion exchange resin in the hydrogen form and converted to phosphoric acid. If it is deemed necessary to first dissolve and filter the pure monocalcium orthophosphate this may be done, preferably in phosphoric acid, and the resulting solution filtered to remove the insoluble residue and the filtered solution then contacted with the appropriate ion exchange resin.

The calcium ions and any other cation that may be present, such as $Fe^{+++}$, $Al^{+++}$ or molecules of compounds acting as cations, e.g., $AlF_2^+$, are selectively removed by the action of the ion-exchange resin. The hydrogen ions simultaneously released by the resin provide the necessary additional hydrogen ion required to produce orthophosphoric acid, according to the following equation:

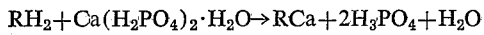
$$RH_2 + Ca(H_2PO_4)_2 \cdot H_2O \rightarrow RCa + 2H_3PO_4 + H_2O$$

Any vagrant cations, e.g., Fe, Al or Si, which may not have been removed by the aqueous or acidic rinse will also be acquired by the ion-exchange resin.

The calcium saturated ion-exchange resin may be regenerated by mineral acids, such as sulfuric acid or hydrochloric acid. The choice of regenerant will be determined by the relative cost of the acid and the relative value of the regeneration product, e.g., calcium sulfate or calcium chloride.

Where the dry crystalline material is contacted directly with wet cationic resin with heat and agitation, the sulfonic acid medium inherent in the cationic resin will solubilize the crystalline material with subsequent evolution of phosphoric acid and saturation of the resin by calcium ions. The end result obtained in this manner is the same as in the case of dissolution.

The acid thus produced will consist of new acid stoichiometrically equivalent to the $P_2O_5$ content of the phosphatic material utilized, less in-process losses, plus recycle acid required to convert the phosphatic material to monocalcium orthophosphate. This recycle acid will be used in whole or part for washing the monocalcium orthophosphate. Where the monocalcium orthophosphate is first dissolved in phosphoric acid prior to contacting it with the ion exchange resin, there will be a third part in the product, a quantity of acid equal to that used to dissolve the monocalcium orthophosphate.

Examples of suitable strongly acidic cationic ion-exchange resins are those of the phenolic methylene sulfonic type, the nuclear sulfonic type or the sulfonated coal type. Such exchange resins are described in United States Pats. No. 2,191,583; No. 2,366,007 and No. 2,518,420. Ion-exchange resins sold under various designations, such as Duolite C–20, Amberlite IR–100, Amberlite IR–105, Amberlite IR–120, Wolfatit P, Wolfatit K and Zeo Karb are mentioned as specific examples of useful commercially available ion-exchange resins.

The following examples illustrate the present invention without, however, limiting the same thereto.

EXAMPLE 1

2,000 milliliters of 75% by weight of orthophosphoric acid, which had previously been used for the manufacture of monocalcium orthophosphate were heated to approximately 100° C. while continuously being agitated to ensure the fullest possible solution of the monocalcium orthophosphate present in the acid and to further ensure that the undissolved monocalcium orthophosphate in the solution would remain suspended and not settle to the bottom of the flask. When the solution reached operating temperature, continuous air sparging was begun and maintained in order to remove as much of the volatile fluorides as feasible.

The mother liquor thus prepared was used as the reactant medium in which an additional 100 grams of apatite concentrate produced from Nemegos titaniferous magnetite-apatite ore and analysing 39.60% $P_2O_5$, 50.08% CaO, 4.34% $SiO_2$, 0.08% $Al_2O_3$, 1.75% HCl soluble Fe and 2.72% F, were reacted with the stoichiometric amount of 55% weight percent $H_3PO_4$ to produce monocalcium orthophosphate. A total of 72.2 ml. of acid was required. The monocalcium phosphate suspension was removed from the digester in aliquots of 500 ml. of mother liquor, allowed to stand briefly in a settling vessel to permit undissolved solids, primarily silica, to settle by gravity and then further transferred to a second beaker where the material was held at a temperature of approximately 89° C. to promote further crystal development.

The material in the recrystallizer was then filtered and washed on a fritted glass filter. The wash solution was 75% by weight phosphoric acid which had been previously saturated with technical monocalcium orthophosphate. The wash liquor, after further dilution to 55% strength, was used to replenish the digester for acid consumed in the manufacture of monocalcium orthophosphate. The dilution to 55% was effected to replace water lost by evaporation. 189 grams of material containing 12% free phosphoric acid was recovered by filtration. The difference between recovered monocalcium orthophosphate and the theoretical yield consisted of material not removed from the digester, settling weir and crystallizer.

EXAMPLE 2

14 grams of monocalcium orthophosphate produced in a fashion similar to that described in Example 1 were dissolved in 58 milliliters of 30% by weight phosphoric acid, technical grade. The resulting solution was contacted with 56 milliliters of Dowex 50W X–8 strong acid ion exchange resin in the hydrogen cycle. The column was eluted with $H_2O$ until the pH was 6.0, and the effluent checked for $H_3PO_4$. The acid strength was determined to be 33%.

EXAMPLE 3

14 gram lots of monocalcium orthophosphate, corresponding to the material in Example 1, were dissolved respectively in 35%, 40% and 45% by weight phosphoric acid and the resultant solutions reacted with hydrogen cycle ion exchange resin. The effluent from the ion exchange columns were collected, the columns washed to pH 6.0, and the concentration of the resulting $H_3PO_4$ determined. They were 38%, 43% and 48.5% by weight, respectively.

EXAMPLE 4

60 grams of monocalcium orthophosphate were mixed with 160 ml. of damp Duolite C–20 strong acid ion exchange resin in the hydrogen cycle. After 5 minutes of mixing to solubilize the monocalcium orthophosphate in the acid produced by the reaction between a part of the salt and the ion exchange resin, the resin-acid-dissolved monocalcium phosphate slurry was added to a standard laboratory glass ion exchange column containing 180 ml. of identical fresh resin and the acid-monocalcium phosphate solution eluted through the fresh resin. The column was washed with distilled water and the total effluent collected, including the acid initially produced. A total of 154.1 grams of acid, specific gravity equal to 1.15 grams per milliliter and equivalent to 26% $H_3PO_4$, was recovered. The acid was checked for calcium ion by standard oxalate precipitation. No detectable calcium was in the acid.

EXAMPLE 5

240 g. apatite of the following composition: 39.6% $P_2O_5$, 49.1% CaO, 2.6% $Fe_2O_3$, 2.4% $SiO_2$, 1.13% $Al_2O_3$ and 2.7% F. were fed into 3000 ml. phosphoric acid 65%, technical grade, at 100° C. under constant stirring. At the same time air was blown into the liquid to remove the HF. After a certain time monocalciumdihydrogenphosphate crystals could be detected with the naked eye. The solution containing the crystals was fed through a decanter to separate the coarse insoluble impurities which were contained in the apatite. The fine impurities went with the crystals and the digesting solution into the crystallizer where larger monocalciumdihydrogenphosphate crystals developed.

In the decanter the solution was kept at 95° C., in the crystallizer at 85° C. After the monocalciumdihydrogenphosphate crystals reached a certain size they were separated from the solution with the aid of a glass filter. The solution was returned for the digestion of more apatite. On the filter the crystals were washed to completely remove the mother liquor with the soluble impurities contained therein. This was effected with a phosphoric acid of 55% $H_3PO_4$ by weight, which had been saturated with monocalciumdihydrogenphosphate. The washed and dried monocalciumdihydrogenphosphate crystals contained 12% of free $H_3PO_4$. The crystals were converted into phosphoric acid with the aid of a cation resin of the type Dowex 50W X–8, on the hydrogen cycle. The washing liquid was used to digest more raw materials. It contained approximately the stoichiometric quantity of $H_3PO_4$ required for the digestion of the apatite. For the further digestion of apatite a mixture of the washing liquid and the remaining digestion liquid from the previous digestion process was used. This mixture was almost completely saturated with monocalciumdihydrogenphosphate. When digesting the apatite with this solution, the formation of MHP crystals started almost simultaneously with the beginning of the digestion.

Altogether 22 circuits were run. Thereby the following quantities were used:

$H_3PO_4$ (55%)—1,329 ml.
$H_2O$—2,145 ml. (to replace evaporation losses)
Apatite—544 g.

The following amount of monocalciumdihydrogenphosphate was produced:

$Ca(H_2PO_4)_2 \cdot H_2O$   817.86 g. (wet) ≃720.26 g. (dry)

Furthermore, an undetermined quantity of monocalciumdihydrogenphosphate was contained in the mother liquor contained in the circuit. The quantity of the solution in the circuit consisted of 3000 ml. and therefore coincided with the quantity of phosphoric acid 65% referred to above.

In every circuit a certain quantity of digesting solution after crystallization of the monocalciumdihydrogenphosphate was taken out since this is necessary under practical plant conditions to avoid an accumulation of impurities like iron, aluminum, lead, etc. in the circuits. The quantity of digesting solution taken out according to this consisted of 1,836 ml. This was replaced with a corresponding quantity of phosphoric acid containing 65% $H_3PO_4$ by weight.

The content of the decanter consisted of coarse insoluble impurities from the apatite. These were dried and weighed. The quantity was 8.1 g. A $P_2O_5$-content could not be found.

EXAMPLE 6

476.1 liters $H_3PO_4$ 80%, technical grade, saturated with monocalciumorthophosphate, were placed in a digesting vessel and heated to 100° C. Added to this phosphoric acid were 124.6 kg. raw apatite of the following composition:

| | Percent |
|---|---|
| $P_2O_5$ | 38.6 |
| CaO | 51 |
| F | 3.08 |
| $SiO_2$ | 1.64 |
| $Al_2O_3$ | 1.2 |
| $Fe_2O_3$ | 0.4 | under continuous stirring. At the same time air was blown through the liquid to remove the HF. After some time the monocalciumdihydrogenphosphate crystals could be detected with the naked eye. The liquid containing the crystals was transferred to the crystallizer and was kept there for about two hours at 85° C. Afterwards the liquid containing the crystals was fed into a drum filter at a rate of 121 l./h. On the filter remained 343.12 kg. of wet crystals which contained .29% insoluble impurities, originating from the apatite. The wet mixture of crystals was washed on the drum filter with phosphoric acid containing 80% $H_3PO_4$ by weight. The washed and dried mixture of crystals contained 14% free $H_3P_4O$.

The mixture of monocalciumdihydrogenphosphate crystals and insoluble solids and phosphoric acid of a 14% concentration were converted in a cation exchange resin of the H-form (trade name Dowex 50W X–8) into phosphoric acid.

The mother liquor from the drum filter was returned into the digesting vessel.

The washing liquid was added to the mother liquor and together with it was returned to the digesting vessel.

A constant quantity of the mother liquor and washing liquor in the order of about 5% of the hourly throughput was separated to be treated for the removal of unwanted cations, i.e., iron, aluminum and other impurities, originating in the apatite.

The process was continuously run for a period of 9 hours and 24 minutes. The following quantities were used;

$H_3PO_4$ (80%)—138.3 l.
$H_2O$—130 l.
Apatite—124 kg.

The following quantity of monocalciumdihydrogenphosphate was obtained:

$Ca(H_2PO_4)_2 \cdot H_2O$   343.12 kg. (wet) ≃295.1 kg. (dry)

The quantity of liquid in the circuit was 467.8 l. and corresponds to the 80% phosphoric acid which was used at the outset.

It can readily be seen that the foregoing process is highly flexible. Input-output ratios can be varied over a wide range, the limiting factor being the ability of the mother liquor to transport the quantity of monocalcium orthophosphate produced therein. Thus, output can be adjusted to meet product needs by the simple expedient of adjusting the input of raw materials. The volume and flow rate of mother liquor remaining constant, there are no enforced maxima or minima of product throughput because of vessel size. At the same time, it is equally feasible to adjust the volume of suspended monocalcium phosphate per unit of mother liquor by adjusting the flow rate without varying the input-output rates of phosphate-containing materials, make-up acid or monocalcium or orthophosphate.

Temperature gradients between digester, crystallizer, and filter can be adjusted to meet the operator's requirements or the limitations imposed by the equipment itself, but do not become determining factors of themselves. The sole effect of lowered temperatures in the cycle from digester to filter/centrifuge is to decrease the amount of monocalcium orthophosphate contained as dissolved salts in the mother liquor. The principal upper limit on temperature is the ability of the filter cloth to stand up under the existing temperatures and concentration of acid (mother liquor). The lower temperature limit will be that at which the reaction will no longer proceed at a rate that can be justified economically.

Since the speed of the reaction between phosphoric acid and a phosphate containing material is beneficially influenced when it occurs in an acidic environment already saturated with monocalcium orthophosphate, the speed of reaction between the reactant materials does not become a limiting factor in itself.

The following is an example of utilizing the invention with a starting material other than apatite:

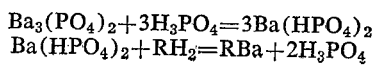

The following are examples showing the use of the invention for producing acids other than phosphoric acid:

$$Al_2(SO_4)_3 + H_2SO_4 = 2Al(HSO_4)_3$$
$$Al(HSO_4)_3 + 3RH = R_3Al + 3H_2SO_4$$
$$Bi_2(SO_4)_3 + 3H_2SO_4 = 2Bi(HSO_4)_3$$
$$Bi(HSO_4)_3 + RH_3 = RBi + 3H_2SO_4$$
$$Cu_3(AsO_4)_2 + H_3AsO_4 (aqueous) = Cu(H_2AsO_4)_2$$
$$Cu(H_2AsO_4)_2 + RH_2 = RCu + 2H_3AsO_4$$

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In the process for the manufacture of phosphoric acid which comprises digesting a phosphate-containing material with phosphoric acid to form a mother liquor containing monocalcium orthophosphate, crystallizing said monocalcium orthophosphate, removing said monocalcium orthophosphate crystals from said mother liquor and contacting said monocalcium orthophosphate crystals with a cationic ion exchange resin on the H-cycle to convert the monocalcium orthophosphate to phosphoric acid, the improvement in which comprises: reacting sufficient amounts of phosphate-containing material with said phosphoric acid to form a mother liquor saturated with monocalcium orthophosphate, and reacting substantially stoichiometric quantities of additional phosphate-containing material and phosphoric acid while maintaining the temperature of the mother liquor solution substantially constant whereby said monocalcium orthophosphate crystals will be formed without reducing the temperature of the mother liquor.

2. A process as claimed in claim 1 in which the phosphate material comprises apatite.

3. A process as claimed in claim 1 in which the temperature of the solution during the reaction is from about 95° to about 105° C.

References Cited

UNITED STATES PATENTS

| | | | |
|---|---|---|---|
| 2,121,208 | 6/1938 | Milligan | 23—109 |
| 2,567,227 | 9/1951 | Miller | 23—109 |
| 3,374,055 | 3/1968 | Villalon | 23—109 |
| 3,401,014 | 9/1968 | Saeman | 23—109 |
| 2,334,904 | 11/1943 | Cheetham | 260—45 |
| 2,671,716 | 3/1954 | Ayres | 23—295 |

OSCAR R. VERTIZ, Primary Examiner

G. A. HELLER, Assistant Examiner

U.S. Cl. X.R.

23—109, 167, 144